United States Patent [19]

McGibbon et al.

[11] 4,440,979
[45] Apr. 3, 1984

[54] CURRENT SINK FOR OPT CHANNEL UNIT

[75] Inventors: Gregor D. McGibbon, San Carlos; Kenneth K. Yu, Mountain View, both of Calif.

[73] Assignee: GTE Automatic Electric Incorporated, Northlake, Ill.

[21] Appl. No.: 373,814

[22] Filed: May 3, 1982

[51] Int. Cl.³ .............................................. H04M 7/06
[52] U.S. Cl. ......................... 179/16 EA; 179/16 AA; 179/18 AH
[58] Field of Search ....... 179/16 EA, 18 AH, 16 EC, 179/16 AA, 16 E; 370/110.1

[56] References Cited

U.S. PATENT DOCUMENTS 3,936,614  2/1976  Suntop ........................... 179/16 EC

*Primary Examiner*—A. D. Pellinen
*Assistant Examiner*—James L. Dwyer
*Attorney, Agent, or Firm*—Russell A. Cannon

[57] ABSTRACT

DC Saturation effects in the VF transformer of a DPT are reduced or eliminated with apparatus diverting cental office battery loop current away from windings of the transformer when a trunk circuit is seized for an off-hook condition of a calling parties telephone handset. A physically smaller transformer having increased inductance may then be employed for providing increased return loss at low frequencies. The apparatus comprises a current amplifier that is electrically connected across tip and ring lines, with a first switch means in its feedback path, and second switch means for AC coupling a transformer winding to the lines. When the trunk is idle for an on-hook condition of the handset, the amplifier is disabled and the lines are terminated with a large resistance. When the trunk is seized for an off-hook condition of the handset, binary PF and CF signals cause the current amplifier to shunt the resistor and to draw a prescribed amount of DC loop current on the lines for energizing a central office A-relay. This also turns on the second switch means for passing VF signals on the lines to and from the transformer, while blocking DC current from the winding, and terminating the lines with a prescribed impedance. When the calling party is dialing, the CF signal opens the feedback path so that the amplifier is turned hard on and off by pulsing of the PF signal for changing the termination impedance and causing resistive pulsing in the central office.

19 Claims, 3 Drawing Figures

CURRENT SINK FOR OPT CHANNEL UNIT

BACKGROUND OF INVENTION

This invention relates to loop signaling and more particularly to method and apparatus for improving the return loss in a dial pulse termination channel unit (DPT) in a pulse code modulation (PCM) system.

A trunk circuit communication channel in a PCM system may comprise a dial pulse originating channel unit (DPO) and a DPT transmitting PCM signals therebetween. In establishing such a PCM communication channel, dialing of the originating or calling parties telephone causes the associated (far end) central office equipment to seize a DPO and transmit PF (pulse function) and CF (control function) signaling information in a PCM signal to a DPT at the near end. The DPT is responsive to a PF signal, indicating an off-hook condition of the calling parties handset, for drawing DC loop current from the near end central office battery on tip and ring lines in order to energize the A-relay there. The practice is to terminate the near end loop in the DPT with an 800 ohm resistor in series with a pair of secondary windings of the VF hybrid transformer there and contacts of a pulsing (PF) relay. Since the approximately 35 milliamperes of DC loop current that is required to energize the A-relay in the near end central office also flows through the secondary windings, it produces a DC saturation of the core of the VF transformer which reduces the transformer inductance and thus return loss at low frequencies. Return loss is defined here as the ratio of the VF power incident on the secondary windings from the near end central office to the power reflected from these windings. Additionally, a control (CF) relay is responsive to a CF signal for shunting these secondary windings and the 800 ohm resistor with a 200 ohm resistor for increasing the DC loop current and reducing distortion during dial pulsing. This structure is illustrated in FIG. 1. In order to maintain the inductance and return loss high, the VF transformer there is made physically large. This means that the transformer is large and expensive, and requires a large surface area on a printed circuit board. Since such a transformer is also relatively tall, this also means that PC boards cannot be located close together. An object of this invention is the provision of method and apparatus for diverting DC loop current away from windings of a transformer so that a smaller and more economical transformer, capable of providing higher inductance and return loss, may be used there.

SUMMARY OF INVENTION

Figure 1:
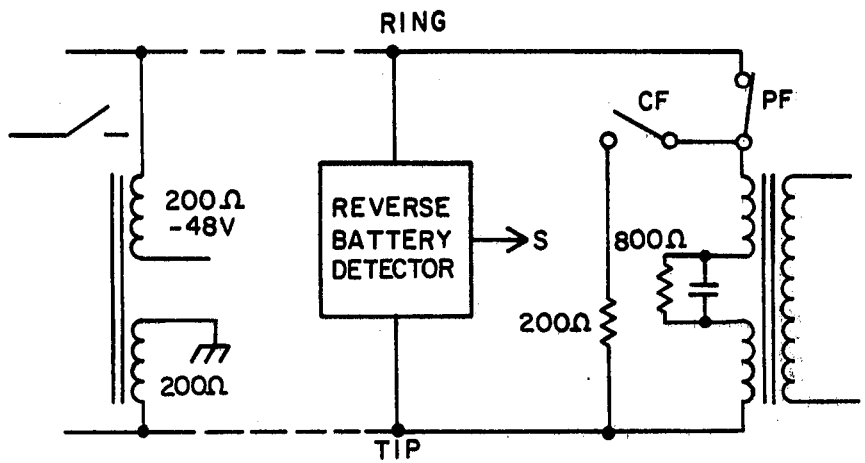
FIG. 1 is a schematic circuit and block diagram of structure and environment in a prior art DPT.

In accordance with this invention, a method of increasing the return loss in an electrical unit, including a transformer having a plurality of windings and operative for selectively passing a DC current in a loop including a pair of lines and passing AC signals on the lines to and from one winding of the transformer, comprises the steps of: AC coupling the lines to the one winding, presenting a high impedance across the lines (and the AC coupled one winding) when the loop is open, and shunting or diverting DC current around the windings when the loop is closed. In accordance with another aspect of this invention, apparatus for separating an AC signal on a pair of lines from a DC signal that is selectively produced on the pair of lines when a loop including the lines is closed, comprises: a transformer having a one winding; first and second nodes; first means for electrically connecting the first and second nodes to associated ones of the lines; second means for selectively AC coupling the one winding across the nodes for coupling only AC signals on the lines to the one winding; current amplifier means electrically connected between the nodes and being inoperative when the loop is open; and third means for selectively causing the amplifier means to conduct and enabling the second means for closing the loop so as to pass DC current on the lines around the one winding and AC signals to the latter. In accordance with yet another aspect of this invention, apparatus responsive to a first control signal (that may be of a first state, of a second state, or varying between first and second states) for selectively passing DC loop current from a source on a pair of lines around a winding of a VF transformer, the lines also carrying voice signals, comprises: first and second nodes; first means electrically connecting the nodes to associated lines; second means for selectively AC coupling the winding across the nodes for coupling voice signals on the lines to and from the winding; third means including a large valved resistor electrically connected across the nodes for terminating the lines with the large resistance when the first signal is a first state; current amplifier means electrically connected between the nodes and having an input terminal; and first switch means electrically connected between a tap point of the third means and the input terminal; the first switch means being responsive to a first state of the first signal for disabling the amplifier and preventing it passing DC loop current, and being responsive to a second state of the first signal for causing the amplifier to conduct for passing DC loop current on the lines around the hybrid winding and for enabling the second means for passing AC signals to and from the winding. In a preferred embodiment, the amplifier has a second switch means electrically connected in a feedback path thereof, the second switch means being responsive to a second control signal of a first state for enabling the amplifier to pass a prescribed value of DC loop current on the lines when the first signal is of a second state. The second switch means is responsive to a second state of the second signal for enabling the amplifier to draw a loop current from the lines that is greater than the prescribed value.

DESCRIPTION OF PREFERRED EMBODIMENTS

Figure 2:
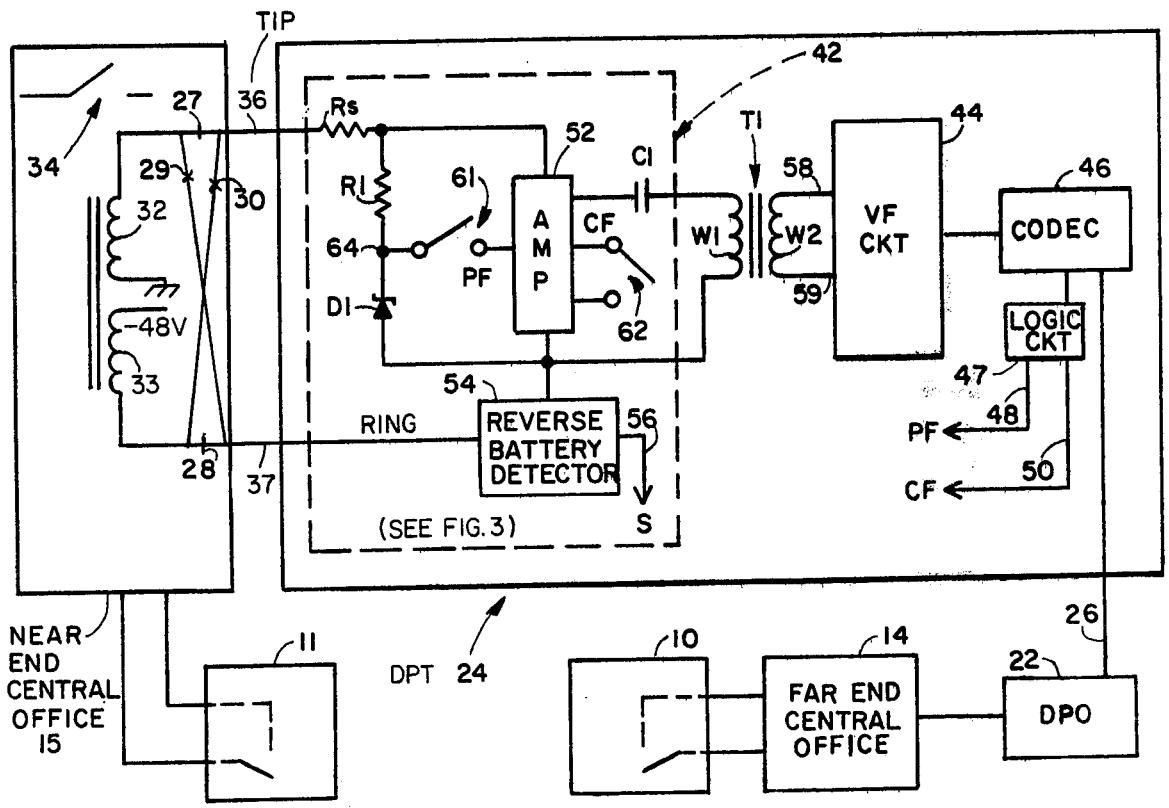
FIG. 2 is a schematic circuit and block diagram illustrating the overall plan of a PCM system including a DPO and a DPT embodying this invention.

Referring now to FIG. 2, the representative communication system illustrated here comprises a pair of subscriber telephones 10 and 11 and associated central offices 14 and 15 that are interconnected by a PCM communication channel established by a dial pulse originating unit (DPO) 22, a dial pulse termination unit (DPT) 24 and a transmission line 26 carrying PCM signals between the DPO and DPT. In this example, the subscriber telephone 10 is designated a calling parties telephone which may be in an on-hook, off-hook, or a dialing condition. The near end or receiving parties central office 15 comprises A-relay windings 32 and 33 which are electrically connected between tip line 36 and ground, and between ring line 37 and the −48 volt central office battery voltage, respectively. Each of these windings has a resistance of approximately 200 ohms. The central office 15 includes relay contacts 27–30 for selectively reversing the battery voltage on the tip and ring lines in the conventional manner when the called parties telephone 11 goes off-hook. The impedance presented across tip and ring lines by the central office 15 is essentially a 900 ohm resistance in series with a 2.15 microfarad capacitance.

The DPT 24 embodying this invention comprises a current sink circuit 42 that is operative for selectively completing the loop for the tip and ring lines so as to pass a DC signaling current in the windings 32 and 33 which energizes the associated A-relay 34, and for selectively AC coupling the tip and ring lines to the primary winding W1 of a VF hybrid tranformer T1. The secondary winding W2 of the transformer is connected through VF processing circuitry 44, such as a filter and amplifier, to a CODEC 46 which converts VF signals to PCM signals for transmission on line 26 to the DPO and visa versa. PF and CF control signal in a PCM signal from the DPO are extracted by logic circuit 47 and outputted on lines 48 and 50.

The circuit 42 comprises a current limiting resistor Rs, a high impedance DC current amplifier means 52, and a reverse battery detector circuit 54 which are electrically connected in series across the tip and ring lines. The circuit 54 detects a reverse battery voltage which is caused to appear on the tip and ring lines when the called parties telephone 11 goes off-hook. VF signals on the output of the amplifer means are connected to the primary winding W1 through an AC coupling capacitor C1. A first switch means 61 is electrically connected between the input terminal of the amplifier 52 and the point 64 at the junction of a large valued resistor R1 and a low voltage breakdown diode D1 for turning the amplifier on and off. A second switch means 62 is located in a feedback loop of the amplifer for establishing the operating point thereof.

In an idle state with the handsets on-hook, both of the switches 61–62 are open for terminating the tip and ring lines in the very high resistance of R1 which is typically 100K ohms. This causes an indication in the far end central office 14 designating that the DPT 24 is idle. This condition of the DPT is called an on-hook condition. When the calling parties telephone 10 goes off-hook and dials the telephone 11, the far end central office 14 seizes an idle DPO 22 which transmits binary PF and CF signaling information to an idle DPT 24 at the near end. The binary PF signal is initially high for seizing the DPT 24. The PF signal is maintained high when the telephone 10 remains off-hook following a dialing operation. This condition with the PF signal high is known as an off-hook condition of the DPT. The PF signal is pulsed or varied between high and low states during transmission of dialing information from the DPO 22. This condition is referred to as dialing. The CF signal is low for opening the switch 62 only during transmission of dialing information, i.e., during pulsing of the PF signal.

When the DPT 24 is initially seized, the PF and CF signals are both high for closing the associated switches 61 and 62. This causes the amplifier means 52 to conduct for reducing the DC impedance across the tip and ring lines and sinking a prescribed DC loop current of approximately 35 milliamperes, which is bypassed around the hybrid T1, for energizing the A-relay 34 in the near end central office 15. This completes the transmission loop between the DPT 24 and the receiving central office 15. The amplifier means 52 maintains a relatively high AC impedance across the tip and ring lines, however, so that VF signals may be AC coupled to and from the VF transformer when the amplifier is on.

After the DPT is seized and the A-relay is energized, pulsing of the PF signal is initiated prior to causing the CF signal to go low for opening the feedback loop of the amplifier. This enhances pulsing and causes the amplifier to be pulsed hard on and off for periodically presenting a resistance of approximately 200 ohms across the lines. This causes the amplifier to periodically draw pulses of approximately 75 milliamperes of DC current from the battery in central office 15, which is bypassed around the hybrid winding W1. This condition of the DPT is called resistive pulsing.

Figure 3:
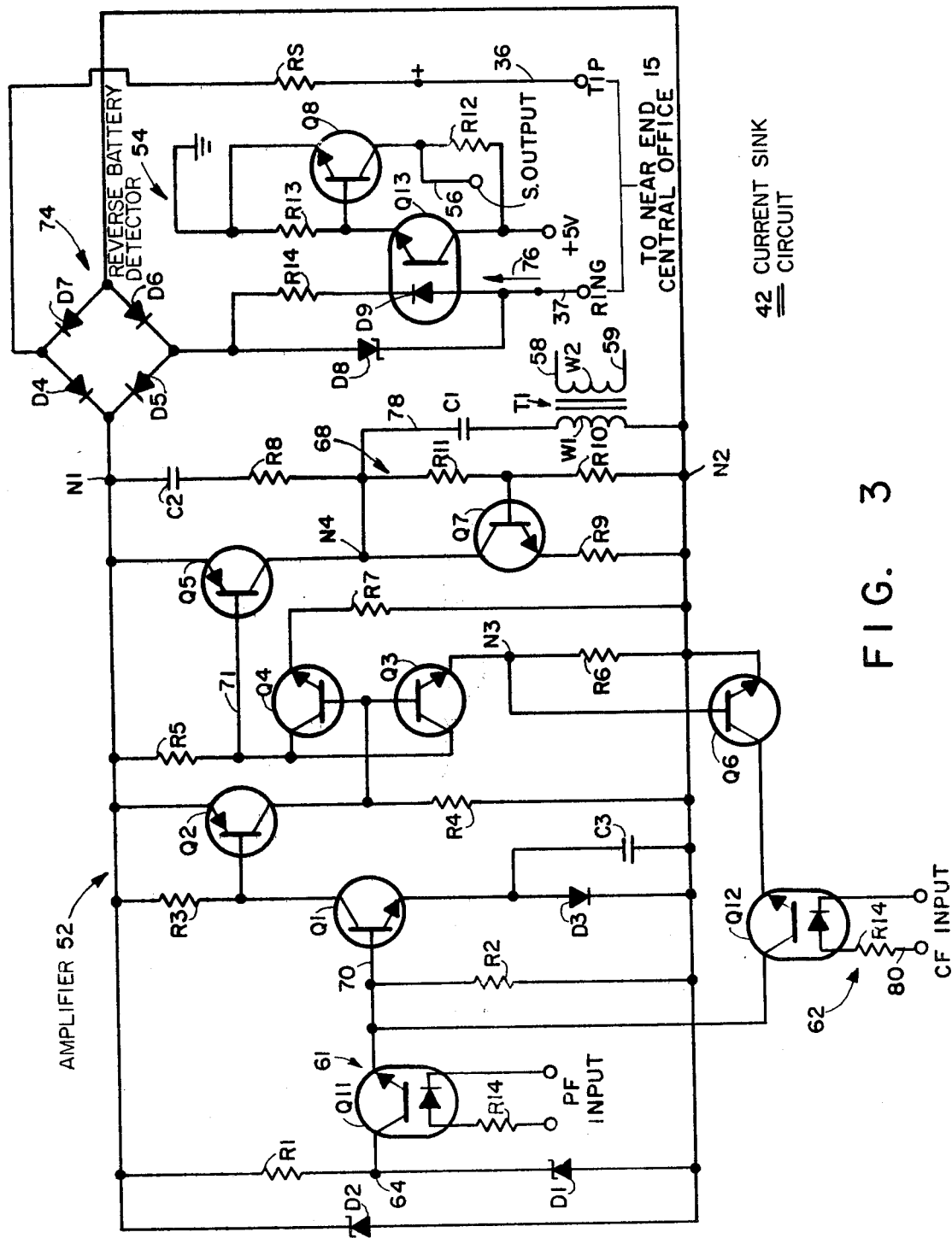
FIG. 3 is a schematic circuit diagram of DPT circuitry embodying this invention.

As shown in FIG. 3, the current sink circuit 42 generally comprises the series combination of R1 and D1 between the nodes N1 and N2 on opposite sides of a multistage current amplifier 52, and the series combination of a switching transistor Q5 and impedance control circuit 68 connected between N1 and N2. The first and second switches 61 and 62 comprise electro-optic transistors Q11 and Q12 which are driven by the PF and CF signals, respectively. The opto-couplers Q11 and Q12 isolate logic voltages from the office battery voltage and maintain longitudinal balance across the tip and ring lines.

The amplifier 52 is a three stage amplifier including the transistors Q1–Q4. The transistor compound Q3–Q4 has a common collector resistor R5 and associated emitter resistors R6 and R7. The primary conduction paths of the optical transistor Q12 and a regulating transistor Q6 are connected in series in the feedback path of the amplifier, between N2 and the input line 70 of the amplifier. The base-emitter junction of Q6 is connected across the emitter resistor R6 for sensing the conduction level of Q3 and fixing the gain of the amplifier so that it passes a predetermined DC loop current such as 35 milliamperes for a requisite PF signal and a nominal battery voltage of 48 volts.

The output of the amplifier on line 71 drives the base of Q5. A coupling capacitor C1 AC couples the collector of Q5 to the hybrid winding W1. The series combination of a resistor R8 and capacitor C2 is connected across Q5 for protecting the latter when the amplifier and Q5 are turned off. The impedance control circuit 68 comprises a transistor Q7 and bias resistors R9–R11. The circuit 68 is operative for fixing or establishing the AC impedance across N1 and N2 at a prescribed value, substantially matching that presented across the tip and ring lines by the central office 15, when the amplifier is conducting and the line voltage is a nominal value.

The diode D1 is a 4.3 volt Zener diode which protects the electro-optic transistor Q11. Alternatively, the element D1 may be a resistor, although this wastes power. The diode D2 is a 150 volt Zener diode which protects active elements in the current sink circuit 42 from excessive voltage which may be caused on the tip and ring lines by lightning. The diode D3 reduces the gain of the Q1 stage by limiting its base current. This stabilizes Q1 and hence the amplifier. The nodes N1 and N2 are connected to the tip and ring lines though a diode bridge 74 which insures that current flows in the same direction in the current sink circuit regardless of the polarity of the battery voltage on lines 36 and 37.

The battery sensor circuit 54 in FIG. 3 is connected in series in the ring line 37. The battery sensor comprises an electro-optic transitor Q13 controlling the bias voltage on a switching transistor Q8, and a zener diode D8 that is connected in parallel with the light emitting diode element D9 of Q13. With the central office 15 providing a normal battery condition with the tip line at ground and the ring line at −48 volts, loop current flows through the current limiting resistor RS, D4, amplifier 52, D6, and D8. Since the electro-optic transistor Q13 is reverse biased by this line voltage, Q8 is cut off to make the binary output voltages thereof on line 56 high for indicating the presence of normal battery voltage on the tip and ring lines. When the tip and ring lines are open, loop current is absent from both D8 and D9 for again holding Q8 cutoff. This makes the logic voltages on line 56 high for indicating a normal battery voltage or an open circuit on the tip and ring lines in accordance with standard practice. With the tip and ring lines connected in reverse to −48 volts and ground, respectively, current now flows in the direction of the arrow 76 in the ring line for activating the light emitting diode D9 of Q13. The resultant current flowing in R13 turns Q8 on for pulling the voltage on line 56 low for indicating a reverse battery voltage condition on the tip and ring lines. The sensitivity of this detector 54 is such that it detects a reverse battery condition even when the PF switch Q11 is open.

The operation of the current sink circuit 42 will now be considered in more detail. In an idle state with the PF signal maintained low, Q11 is cutoff for disabling the current amplifier. The circuit 42 then draws approximately 400 u amperes of DC idle current on the tip and ring lines through Rs, D4, R1, D1, D6 and D8. The 100K ohms resistance of R1 establishes the value of idle current such that is is not sufficient to energize the A-relay in the near end central office. This high resistance of R1 also represents an open circuit on the tip and ring lines for indicating to the far end central office 14 that the DPT 24 is idle. This corresponds to an on-hook condition of the handsets.

When the PF and CF signals are initially high for seizing the DPT 24 and a transmission circuit in the near end central office 15, Q11 conducts for turning on the current amplifier and Q12 conducts for closing the feedback loop. Conduction of the amplifier transistors Q1–Q4 then shunts R1 for decreasing the termination impedance on the tip and ring lines and increasing the DC loop current. The resultant current in the Q3 emitter resistor R6 is translated to a bias voltage in the base circuit of Q6. When this voltage on R6 exceeds approximately 0.6 volts, Q6 turns on for diverting current from the input line 70 of the current amplifier and fixing the operating level and impedance thereof. This causes the amplifier 52 to pass a prescribed DC loop current of approximately 35 milliamperes, which is sufficient for energizing the A-relay 34 in central office 15. Since Q1–Q4 are operating in a linear region, the amplifier presents a large AC impedance across the nodes N1–N2. This operation of Q1–Q4, however, also means that the emitter-to-collector impedances thereof may vary nonlinearly and have a positive slope as a function of the line voltage between N1 and N2.

The operation of the amplifier decreases the Q4 collector voltage on line 71 for turning the switch Q5 fully on. This provides a path which AC couples VF signals between the lines and T1. Conduction of Q5 also causes current flow in R10–R11 which turns on Q7 and causes it to operate in the linear mode. This operation of Q7 and R9–R11 presents a complex impedance across nodes N1 and N2 which is considerably less than that provided by amplifier 52 but which is also sensitive to variations of line voltage. This impedance of the control circuit 68 is selected to combine with that of amplifier 52 for terminating the tip and ring lines during normal off-hook operation with a predictable impedance, such as a 900 ohm resistance in series with a 2.15 microfarad capacitance, which matches that presented on the tip and ring lines by central office 15. This may be accomplished empirically by replacing the network 68 with a variable resistor which is adjusted for maximum return loss as a function of line voltage, and then designing the circuit 68 to provide substantially the same resistance versus line voltage characteristics. This combination of circuits 52 and 68 then maintains the above mentioned impedance across the tip and ring lines generally constant for fluctuations of line voltage caused by the level of office battery and loop length, since the change in impedance of circuit 68 is generally complementary to that of amplifier 52. This operation corresponds to that for an off-hook condition of the DPT.

Following initial seizure of the DPT 24 and energization of the A-relay by operation of amplifier 52, a train of pulses appears in the PF signal and the CF signal goes low. This CF signal turns off Q12 for opening the feedback path controlling the gain of the current amplifier. Without feedback control, the transistors Q1–Q4 are driven into saturation when Q11 conducts for reducing the Q1–Q4 collector-emitter voltages and the termination impedance provided by the current amplifier. The resultant loop current increases to approximately 75 milliamperes. This also reduces the voltage between nodes N1 and N2 to about four diode voltage drops so that the tip and ring lines are essentially terminated by the 200 ohm resistance of current limiting resistor Rs. This line termination resembles a pure resistor so that the PF signal now causes resistive pulsing of central office 15, which is the generation of pulses of DC loop current on the tip and ring lines at a rate controlled by the PF signal.

With the CF signal maintained low for holding the feedback loop open, pulsing of the PF signal turns the current amplifier hard on and off at a rate set by the PF signal for periodically generating pulses of DC loop current on the tip and ring lines and creating the resistive pulsing condition there. The resultant DC loop current is approximately 75 milliamperes. Since Q5 is also turned full on by pulsing of the current amplifier, the series combination of C1 and W1 is essentially shunted by the series combination of the Q5 collector-base junction, the Q3 collector-emitter junction, and the Q6 base-emitter junction, which is the equivalent of about three diode voltage drops or approximately 2.1 volts, for effectively removing C1 and W1 from the circuit. When the PF signal is low during pulsing, Q5 is abruptly turned off. The series connected elements R8 and C2 are connected across Q5, and in series with C1 and W1, for shaping current pulses and reducing an overshoot of as much as 150 volts on the termination of a current pulse for protecting the transistor switch Q5.

In an embodiment of this invention that was built and successfully operated, elements had the following values: $C1 = 1.8\ \mu f$; $C2 = 0.33\ \mu f$; $C3 = 560\ pf$; $R1 = 100K\Omega$; $R2 = 51.1\ K\Omega$; $R3 = 100K\Omega$; $R4 = 10K\Omega$; $R5 = 31.6K\Omega$;

R6=R7=34.8Ω; R8=511Ω; R9=287Ω; R10=2.87KΩ; R11=61.9KΩ; R12=75KΩ; R14=147KΩ; D1=4.3 V; D2=150 V; D8=2.4 V. This current sink current 42 passed approximately 34 milliamperes and 75 milliamperes of loop current with the feedbck path closed and open, respectively. The return loss of the circuit was 40 dB over a frequency range of 500 Hz–3400 Hz, for a nominal battery voltage of 48 volts. The return loss remained greater than 35 dB for a battery voltage varying from 20 to 48 volts.

Although this invention is described in relation to preferred embodiments thereof, variations and modifications will occur to those skilled in the art. By way of example, electo-mechanical relays, transistor switches or other types of switches may be employed in place of the electo-optic transistors. Additionally, an electo-optic transistor switch, electro-mechanical relay or other type of switch may be located in the line 78, and controlled by the CF input signal, for disconnecting C1 and W1 from the current amplifier during resistive pulsing. Also, this invention may be utilized in other applications including trunk circuits in telephone systems associated with other than PCM communication channels, and in other type of applications where it is desirable to separate AC and DC signals on a pair of lines. Further, a voltage inverter may be located in the line 80 of Q12 so that the feedback loop is closed when the CF signal is low. Also, the CF signal may go low before initiation of pulsing of the PF signal. Additionally, the PF signal may be low for seizing the DPT and the CF signal may be high for opening the switch 62. Alternatively, the PF and CF signals may be analog voltages. Also, the reverse battery detector 54 may be located in the line 36. And the current may be sensed in one of the Q1–Q4 collector resistors, rather than R6, by connecting the Q6 base-emitter junction across it. The scope of this invention is therefore determined from the attached claims rather than the aforementioned detailed descriptions.

What is claimed is:

1. Apparatus responsive to a first control signal that is one of a first state, a second state, and varying between the first and second states for selectively passing DC loop current from a source on a pair of lines and around a winding of a VF transformer only when the first signal is of the second state, and passing VF (voice frequency) signals on the lines to and from the winding, comprising:

first and second nodes;
first means for electrically connecting said nodes to associated lines;
second means for selectively AC coupling the winding across said nodes for coupling VF signals on the lines to and from the winding;
third means electrically connected across said nodes and including a first resistor having a larger resistance between a side thereof and a tap thereof for terminating the lines with the large resistance of said first resistor when the first signal is a first state; current amplifier means electrically connected between said nodes and having an input terminal; and
first switch means electrically connected between said tap and said input terminal of said amplifier means and responsive to a second state of the first signal for causing said amplifier means to conduct for passing DC loop current on the lines and around the winding; a first state of said first signal disabling said amplifier means for preventing it passing DC loop current.

2. Apparatus according to claim 1 which is also responsive to a second control signal that is a second one of two states when the first signal is varying between first and second states, and wherein said current amplifier means comprises second switch means in a feedback path thereof that is electrically connected to said input terminal; said second switch means being responsive to a first state of the second signal for causing said current amplifier means to pass a prescribed DC loop current on the lines when the requisite first signal is present, said second switch means being responsive to a second state of the second signal for opening the feedback path and causing said current amplifier means to draw a DC loop current from the lines that is greater than the prescribed value for pulses of the first state in the first signal.

3. Apparatus according to claim 2 wherein said second means comprises: a first capacitor, which is an AC coupling capacitor; a second resistor and a second capacitor electrically connected in series between one side of the winding and one of said nodes, values of the second resistor and second capacitor being selected for shaping the trailing edge of current pulses developed on the lines during pulsing of the first signal; and fourth means electrically connecting said first capacitor in one of (1) the electrical connection of said second resistor and second capacitor to said one side of the winding and (2) between the other side of the winding and the other one of said nodes.

4. Apparatus according to claim 2 wherein said second means comprises: a first capacitor, which is an AC coupling capacitor; third switch means electrically connected in series between one side of the winding and one of said nodes; and fourth means electrically connecting said first capacitor in one of (1) the electrical connection of said third switch means to said one side of the winding and (2) between the other side of the winding and the other one of said nodes; said third switch means being responsive to conduction of said amplifier means in passing DC loop current for closing and providing a low impedance path for VF signals to and from the winding.

5. Apparatus according to claim 4 comprising impedance control means electrically connected between said third switch means and the other one of said nodes and operative in conjunction with conduction of said amplifier means for terminating the lines in a prescribed impedance when said amplifier means is operating for passing DC loop current.

6. Apparatus according to claim 5 wherein said amplifier means comprises first transistor means having ones of its emitter and collector electrically connected through associated resistors to associated ones of said nodes, and having a base electrically connected to said input terminal; the collector of said first transistor means being connected to said third switch means for controlling the operation thereof; and second transistor means having its base-emitter junction electrically connected across one of said emitter and collector resistors of said first transistor means and having its collector electrically connected through said second switch means and the feedback path to said input terminal.

7. Apparatus according to claim 6 wherein said second means further comprises the series combination of a second resistor and a second capacitor electrically connected across said third switch means for shaping current pulses developed on the lines during pulsing of the first signal.

8. Apparatus according to claim 6 wherein said impedance control means comprises a third transistor means having its collector and emitter electrically connected to one side of said third switch means and to the one of said nodes that is spaced from said third switch means, and second and thid resistors electrically connected across the base-collector and the base-emitter junctions, respectively, of said third transistor means; closing of said third switch means causing said third transistor means to conduct for establishing the value of impedance presented across the lines during operation of said amplifier means in passing DC loop current.

9. Apparatus according to claim 6 wherein said first and second switch means are electro-optic transistor means.

10. Apparatus according to claim 6 wherein said third means comprises low voltage diode breakdown means electrically connected between the other one of said nodes and said tap point and operative for limiting the voltage developed across said first switch means.

11. Apparatus for separating an AC signal on a pair of lines from a DC signal current that is selectively produced on the pair of lines when a loop including the lines is closed, comprising:
 a transformer having a winding;
 first and second nodes;
 first means for electrically connecting said first and second nodes to associated ones of the lines;
 second means selectively AC coupling said one winding across said nodes for coupling only AC signals on the lines to and from said winding;
 current amplifier means electrically connected between said nodes and being inoperative for opening the loop; and
 third means for selectively causing said amplifier means to conduct for closing the loop and passing a DC loop current on the lines around said winding.

12. Apparatus according to claim 11 comprising impedance control means electrically connected between said nodes and operative in conjunction with conduction of said current amplifier means for terminating said lines in a prescribed impedance.

13. Apparatus according to claim 11 wherein said winding has one and other sides thereof and said second means comprises a first capacitor which is an AC coupling capacitor, fourth means which is a connecting means, and first switch means that is closed by conduction of said amplifier means; said first switch means being electrically connected between one of said nodes and one side of said winding; said fourth means electrically connecting said first capacitor in one of (1) the electrical connection of said first switch means to the one side of said winding, and (2) between the other side of said winding and the other one of said nodes, said first switch means being responsive to conduction of said amplifier means in passing loop current for closing and providing a low impedance path for AC signals on the lines to and from said winding.

14. Apparatus according to claim 13 comprising impedance control means electrically connected between the other side of said first switch means and the other one of said nodes and operative in conjunction with conduction of said current amplifier means for terminating said lines in a prescribed impedance.

15. Apparatus according to claim 14 wherein said third means is responsive to a second state of a first control signal for selectively causing said amplifier means to conduct, said amplifier means comprising a feedback path including second switch means which is responsive to a first state of a second control signal for closing the feedback path for causing DC current to be a prescribed value and responsive to a second state of the second control signal for opening said feedback path for causing said amplifier means to pass a DC loop current which is greater than the prescribed value thereof when the requisite first control signal is present which causes said amplifier means to conduct.

16. Apparatus according to claim 15 wherein said amplifier means comprises a first transistor means having emitter and collector electrically connected through associated resistors to associated ones of said nodes and having a base driven by said third means, the operation of said first switch means being controlled by the operation and collector voltage of said first transistor means; and a second transistor means having its base-emitter junction electrically connected across one of said emitter and collector resistors of said first transistor means and having its collector electrically connected though the feedback path to said third means.

17. Apparatus according to claim 16 wherein said second means further comprises the series combination of a first resistor and a second capacitor electrically connected across said first switch means for shaping current pulses developed on the lines during pulse transistions of the first control signal between second and first states.

18. Apparatus according to claim 17 wherein said impedance control means comprises a third transistor means having its collector and emitter electrically connected to one side of said first switch means and to the one of said nodes that is spaced from said first switch means, and second and third series connected resistors electrically connected across the base-collector and base-emitter junctions, respectively, of said third transistor means; closing of said first switch means causing said third transistor means to conduct for setting the value of impedance established across the lines during operation of said current amplifier means in passing DC loop current.

19. Apparatus according to claim 18 wherein said third means comprises third switch means responsive to the first control signal and the series combination of a fourth resistor and a low voltage breakdown means electrically connected between said nodes, with the junction of the latter electrically connected through said third switch means to the base of said first transitor means.

* * * * *